Sept. 13, 1955 O. A. CLOUGH 2,717,468
FISH LURES
Filed July 20, 1953

INVENTOR.
Owen A. Clough
BY
Martin E. Anderson
ATTORNEY

United States Patent Office 2,717,468
Patented Sept. 13, 1955

2,717,468
FISH LURES

Owen A. Clough, Denver, Colo.

Application July 20, 1953, Serial No. 369,078

2 Claims. (Cl. 43—42.51)

This invention relates to improvements in fish lures.

Fishermen find that the amount of fish they catch depends in a great measure on the kind of artificial bait or lure they employ. In some instances a rapidly revolving bait is more successful than others and in other places a lure that has a jiggle motion is better. In every case, however, it is desirable that the lure has an inherent tendency to stay under the water as it is trolled.

In order to be prepared to obtain the best results a variety of lures must be carried and successively tested.

It is the object of this invention to produce a lure of such construction that it can be quickly altered to change its behavior when trolled in the water and thereby avoid the necessity for carrying many lures.

Another object is to produce a lure that when adjusted to one position will rotate and in which the speed of rotation can be adjusted. The same lure can be adjusted to move with a quick jerky movement or "jiggle" and in which the rate of the "jiggle" can be changed by a simple adjustment.

A further object is to produce a lure that can be adjusted to carry two hooks and which is also provided with means for attaching a worm or worm-like bait thereto.

Figure 1:
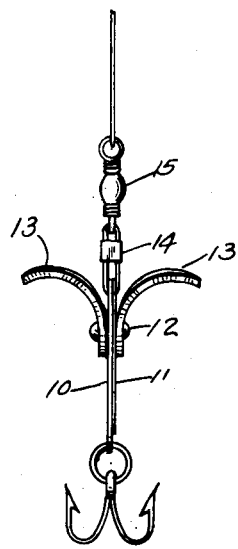
Figure 2:
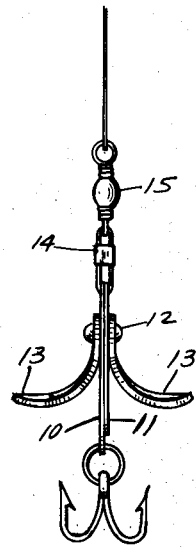
Figure 6:
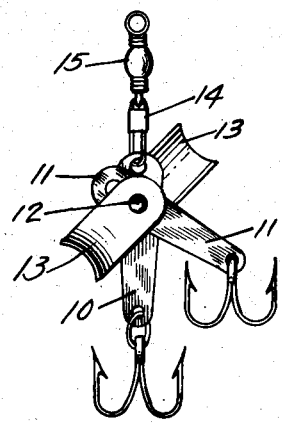
Figure 7:
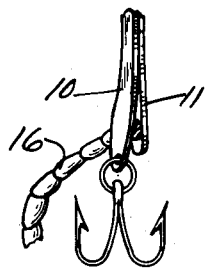

The above and other objects that may appear as the description proceeds are attained by means of a construction and arrangement of parts that will now be described in detail for which purpose reference will be had to the accompanying drawing where the invention has been illustrated so as to show some of the many adjustments and in which:

Figures 1 and 2 show an edge view of the lure with the blades in different positions;

Figures 3 to 6 inclusive show side elevations in various forms of adjustment, and Figure 7 is a fragmentary detail perspective view showing how a worm can be attached to the lure adjacent the hook, the wings, line connection and pivotal connection being omitted.

The views on the drawing are substantially full size and from them it will be seen that the body of the lure consists of two thin plates 10 and 11 each of which is provided at its ends with openings as shown. The plates are mounted for relative angular movement about pivot 12. Attached to the body by pivot 12 are two identical blades or wings 13 that are made from any suitable rustless material such as brass, aluminum, stainless steel or plastic, and are substantially arcuate. The end through which rivet 12 extends are preferably flattened so as to have the outer surface tangent to the arcuate portion thus provide more friction to hold them in adjusted position. The blades are also transversely concave-convex with the transversely concave side on the convex surface.

Rivet 12 that holds the parts in assembled position is of such length that the contacting surfaces of the several parts engage each other with sufficient pressure to hold them frictionally in adjusted position.

In all of the views with the exception of Figure 6, the two body members have been shown in total overlapping position and therefore the holes at the wider ends are in register. Link 14 prevents the body member from turning relative to each other to any material extent. In Figure 6 the lower or longer end of member 11 is provided with a fish hook the same as the corresponding end of member 10. Body members 10 and 11 may also be turned relative to each other 180 degrees so that the link 14 and swivel 15 will be attached to same end of member 11 as that which carries the hook in Figure 6. Since rivet 12 is positioned nearer the hole in the wider end than to the hole in the narrow end the link 14 will be further from the pivot than when the parts are in the position shown in Figures 1 and 2, and this slows the rate of "jiggle" when the parts are otherwise in the position shown in Figure 1. When a worm 16 is used as bait it can be clipped between the ends of the body members as shown in Figure 7.

The two blades can obviously be adjusted relative to each other and to the body members in an endless member of different ways and each different adjustment, regardless of how small, produces a slightly different action of the lure when pulled through the water in trolling.

When the blades are arranged as in Figure 1 the lure will not rotate but will move jerkily or jiggle, if one of the blades is moved even slightly relative to the other the lure will also rotate. When the blades are arranged as in Figures 2 and 3 the lure will also jiggle as in Figure 1 but at a different rate. When the blades are shifted from the position shown in Figure 1 to that shown in Figure 5 the lure will turn quite fast and at the same time more jerkily. In all of the positions shown in Figures 4, 5 and 6 the lure will rotate but at varying speeds.

Figure 3:
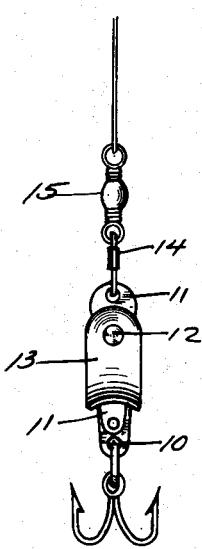
Figure 4:
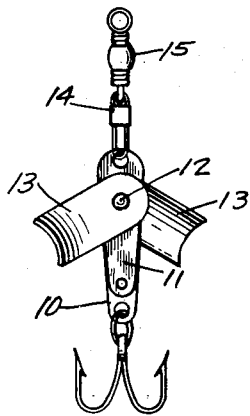
Figure 5:
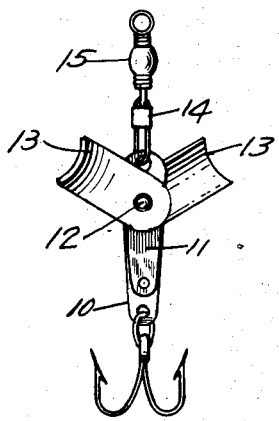

When the blades are positioned as in Figures 1, 2 and 3 there is no appreciable rotation.

The transverse curvature of the blades produces a very decidedly different action than the same blades without the transverse curvature.

In all of the positions of the blade shown the lure tends to stay down and does not climb to the surface as most other lures do.

Tests have shown that the lure described above gives very satisfactory results in actual use.

Applicant is aware that it is not new to use blades or wings to effect a rotary motion as this is broadly old in U. S. Patent 1,606,176, issued November 9, 1926. Applicant's arcuate and transversely curved blades produce a variety of effects that cannot be obtained by the use of flat blades.

Body members or strips 10 and 11 are formed from resilient material such as spring brass or any other suitable rustless material.

What is claimed as new is:

1. An artificial bait having a flat elongated body formed from two thin resilient metal strips connected for relative turning movement about a pivot positioned between their ends, each strip having a hole near each end, one strip being longer than the other, the distance from the pivot to the holes at one of the ends of the strips being the same for both, the corresponding distance at the other ends being longer for the longer strip so that when the strips are in one position the line can be anchored to both and the hook attached to the longer strip, the longer portion of the shorter one strip being resiliently separable from the other strip and forming means for anchoring a worm or like bait thereto.

2. An artificial bait in accordance with claim 1 in which means comprising curved blades are attached to the pivot, one on each side of the two resilient metal strips for effecting rotation of the bait when it is pulled through the water.

References Cited in the file of this patent

UNITED STATES PATENTS

| D. 148,254 | Rooke | Dec. 30, 1947 |
| D. 152,526 | Geiser | Feb. 1, 1949 |
| 2,021,796 | Liotta | Nov. 19, 1935 |

FOREIGN PATENTS

| 23,482 | Great Britain | 1899 |
| 63,051 | Denmark | Dec. 24, 1944 |